United States Patent
Fiaux et al.

(10) Patent No.: US 10,964,203 B1
(45) Date of Patent: Mar. 30, 2021

(54) METHOD AND DEVICE FOR HDMI CEC CONTROL

(71) Applicant: Control4 Corporation, Salt Lake City, UT (US)

(72) Inventors: Patrick Fiaux, Bournens (CH); Michael Vogt, Bern (CH); Raphael Oberholzer, Derendigen (CH)

(73) Assignee: WirePath Home Systems, LLC, Salt Lake City, UT (US)

( * ) Notice: Subject to any disclaimer, the term of this patent is extended or adjusted under 35 U.S.C. 154(b) by 0 days.

(21) Appl. No.: 16/280,725

(22) Filed: Feb. 20, 2019

Related U.S. Application Data

(60) Provisional application No. 62/632,747, filed on Feb. 20, 2018.

(51) Int. Cl.
| | |
|---|---|
| *H04N 5/44* | (2011.01) |
| *G06F 1/26* | (2006.01) |
| *G08C 17/00* | (2006.01) |
| *H04N 21/422* | (2011.01) |
| *G06F 1/3206* | (2019.01) |
| *H04N 21/4363* | (2011.01) |
| *G06F 1/3203* | (2019.01) |
| *H04L 12/28* | (2006.01) |

(52) U.S. Cl.
CPC ........... *G08C 17/00* (2013.01); *G06F 1/3203* (2013.01); *G06F 1/3206* (2013.01); *H04N 21/4221* (2013.01); *H04N 21/43635* (2013.01); *H04L 2012/2841* (2013.01); *H04N 21/42204* (2013.01)

(58) Field of Classification Search
CPC ........ A63F 13/332; A63F 13/35; A63F 13/65; A63F 13/828; H04N 21/4104; H04N 21/42203; H04N 21/42204; H04N 21/4223; H04N 21/43635; H04N 21/47; H04N 21/4751; H04N 21/4788; H04N 21/6125; H04N 21/6175; H04N 21/854; H04N 21/42207; H04N 21/42208; H04N 21/44008; H04N 21/472; H04N 21/8186; H04N 21/42221; H04N 21/4424; H04N 21/4225; G06F 3/0482; G06K 9/4604; H04L 2012/2841
See application file for complete search history.

(56) References Cited

U.S. PATENT DOCUMENTS

| | | | | |
|---|---|---|---|---|
| 2009/0290065 | A1* | 11/2009 | Asayama | H04N 5/44543 348/553 |
| 2010/0070783 | A1* | 3/2010 | Okamoto | H04N 21/4223 713/310 |
| 2011/0113264 | A1* | 5/2011 | Kim | G06F 1/263 713/300 |
| 2014/0132844 | A1* | 5/2014 | Burns | H04N 21/44231 348/734 |
| 2015/0360133 | A1* | 12/2015 | Maccallum | A63F 13/828 463/42 |

(Continued)

*Primary Examiner* — Dionne Pendleton
(74) *Attorney, Agent, or Firm* — Austin Rapp

(57) ABSTRACT

The present invention relates to the field of controlling or remote controlling consumer electronic devices which are connected to each other via so-called HDMI cables and capable of receiving and/or transmitting CEC control commands. In particular, the invention relates to a method for the reliable control of target devices while simultaneously determining their state.

16 Claims, 1 Drawing Sheet

(56) References Cited

U.S. PATENT DOCUMENTS

2018/0146233 A1* 5/2018 Satheesh ............... G06K 9/4604
2019/0101966 A1* 4/2019 Park ......................... G06F 1/28
2019/0342625 A1* 11/2019 Fenn .................. H04N 21/4104

* cited by examiner

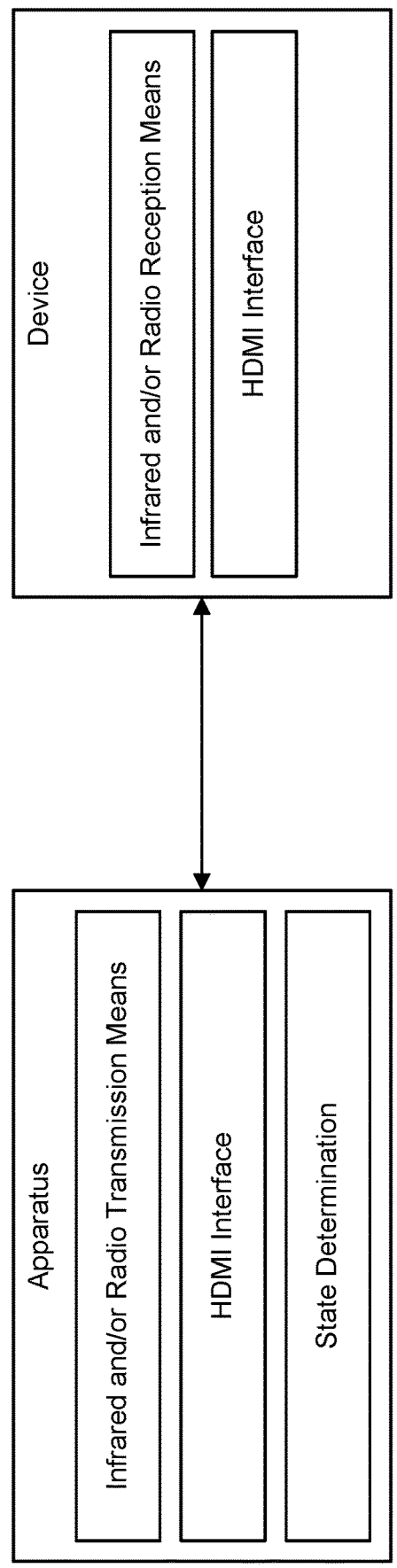

METHOD AND DEVICE FOR HDMI CEC CONTROL

RELATED APPLICATION

This application is related to and claims priority from U.S. Provisional Patent Application Ser. No. 62/632,747, filed Feb. 20, 2018.

INTRODUCTION

The present invention relates to the field of the control or remote control of electronic devices of consumer electronics which via so-called HDMI cables are connected to each other and capable of sending and/or receiving CEC controlling commands. In particular, the invention relates to a method for the reliable control of target devices while simultaneously determining the state of these devices.

PRIOR ART AND DRAWBACKS

Via the "High Definition Multimedia Interface" (HDMI) not only video and audio in digital quality can be transferred by using suitable cables of the HDMI specification, but also commands for the system control via the control protocol CEC (Consumer Electronics Control).

With the establishment of the HDMI standard in a multitude of devices of consumer electronics, CEC created a possibility for the control of e.g. video and audio sources, the AV receiver and the TV device or beamer across devices or components. Ideally, all devices, e.g. televisions, TV receivers, AV receivers, Blu-ray players, gaming consoles and sound systems can be connected via HDMI and then remotely controlled in compound through CEC.

The control protocol CEC follows a defined standard in order to at least control the basic functions of all devices of a replay chain, e.g. with a remote control. In this way, e.g. AV receiver and television together with the player may be switched on and to the correct input if the player's 'play' function is activated which may either be effected directly at the device or, in the alternative, with a suitable remote control. Conversely, all devices may be switched off or put in standby, if e.g. the TV or the player is switched off or put in standby.

Moreover, the CEC control enables a still further reaching communication between devices involved in a replay chain in which each of the devices has a HDMI interface and is connected via suitable HDMI cables, as for example for the transfer of drive commands or the channel alignment between a receiver and a TV device. Although the development of this technology for the signal transmission takes place in the context of an internationally recognized specification, the specific embodiments and denominations used by the producers involved in this development and application in part clearly differ from each other, wherein at least the basic functions of the CEC control such as e.g. the generation of discrete commands for switching on and off should, however, function across producers.

In principle, the CEC control can be used in all devices having HDMI ports of specification 1.0 or higher. It works with a simple control signal which is transferred via a single-wire serial data line (data bus) on pin 13 of the 20-pole HDMI cable. The nominal data bit rate is ca. 2.4 ms corresponding to a data rate of ca. 417 bit/s. The connection establishment and the verification of CEC capability is effected in the course of EDID handshakes upon Hot-Plug-Event which happens upon switching-on the devices or also when a HDMI plug is inserted into a HDMI port. For functioning of the control, all devices being connected with each other must support CEC. In case of connections across producers, mostly only basic functions are controllable via CEC. If, for example, one switches on a video source and pushes on 'play', the connected television as well as a possibly interconnected AV receiver are also activated and both devices are switched to the correct input. If the television is switched off, also the sources being connected via HDMI go into standby or are switched off. This control option may also be de-selected on certain devices such as AV receivers, which is meaningful e.g. if one wants to listen to a CD after having watched television.

Summarizing briefly, remote controlling across producers functions as follows: subject to the condition that all devices of the replay chain support CEC, all connected devices are switched on essentially simultaneously upon the start of a single device and automatically find their corresponding channel (input). Accordingly, if one switches on the Blu-ray player, the television also turns on and searches the appropriate channel to the player by itself such that, ideally, only a single remote control is needed. What sounds great in theory does not always function frictionless in praxis because the manner by which CEC is performed between HDMI connected devices is a very much individual matter. If one can indeed e.g. switch on and off the television with the remote control of a receiver and the Settop-Box likewise does react to the switching-on and off of the TV, other receivers remain in operation when the TV is turned off. The extent as to which functions are executed through HDMI CEC depends upon the devices involved. If one e.g. wants to watch TV it is sufficient to turn on the Sat-Receiver because the latter provides for the TV to be switched on. But instead of watching the receiver selected program, another one which the TV receives from the internal tuner may be displayed. If, for example, several devices are connected through HDMI, unexpected switching operations may emerge, such as when the Blu-ray player turns on when the TV's HDMI-IN port is deliberately changed. More closely, this does not mean to be a malfunction. It rather relates to the viewpoint out of which the switching operations are considered. The fact that these do not always match a user's expectation from electronics nowadays often represents lived reality.

Although CEC in principle should be supported by HDMI such that it only activates devices when these are needed and switches them off as soon as they are no longer used, it can be stated that this leads to problems in practice. As long as e.g. only one receiver is connected to a television via HDMI this may well function. As soon as a further device such as a Blu-ray player is connected to the TV, praxis does not hold what the theory promises. If one e.g. has watched satellite TV before and now changes to the Blu-ray player, the TV has to be switched to another HDMI-Input. The one to which the sat receiver is connected is no longer considered by CEC resulting in the Set-Top box remaining activated even after the switching off of the television. Another example refers to the recording of a program which is received by the sat receiver and also watched on TV on a DVD recorder. While the program is still running the TV is turned off because the user decides to continue to watch the program which is recorded in parallel at a later time point. Upon switching off the TV it also transmits via CEC a Power-off impulse to the sat receiver which follows the request and turns down. Although the DVD recorder continues the recording this does only relate to a black picture without audio because its signal source in the form of the sat receiver had been switched off together with the TV.

To connect devices witch each other and commonly controlling them via HDMI CEC in an intelligent way thus often turns out to be error-prone because the reliable performance of the control activities fail due to the user's wish. Assuming that one wants to watch a Blu-ray. Upon switching on the television the sat receiver is also activated simply because its HDMI input had been selected the day before. The receiver must now be switched off and the Blu-ray player has to be turned on manually. It is similarly annoying when the TV which in the meantime receives DVB-T with the internal tuner turns down only because the no longer needed sat receiver is switched off to save energy.

A further problem relates to devices whose design does not enable discrete 'On' and 'Off' commands but solely a 'Power toggle' which upon activation triggers the status not being the current one. If such a device is e.g. off or in standby, pressing the Power toggle results in turning on the device and vice versa which in the context of a given HDMI CEC replay chain causes problems when the intended CEC activation is performed by another device of the chain.

Due to the above mentioned design basis of a 'One Display' approach, problems inevitably also arise with HDMI switchers and in multi-room systems because naturally there are several targets which is not foreseen by CEC upon its addressing. Besides generally waiving CEC this problem can only be solved with systems that permit the isolation or routing of the CEC traffic independent from audio and video signals.

According to the current state of the art, a complete and reliable CEC-aided control of all devices of a replay chain with only one remote control does only function with devices of the same producer.

OBJECT OF THE INVENTION AND SOLUTION

The object of the present invention thus relates to the provision of a method for using the CEC command function in use of a device replay chain interconnected via HDMI CEC while simultaneously determining the state of at least one device comprised by the chain, with which the above described problems of the state of the art can be overcome. A further object relates to the provision of a device having a HDMI interface which enables to determine and optionally control the state of the at least one device.

For solving the problem a method according to the main claim is suggested. Preferred embodiments are detailed in respective sub claims. Furthermore, a device for carrying out the method is provided.

BRIEF DESCRIPTION OF THE DRAWINGS

FIG. 1 is a block diagram illustrating an example of an apparatus and a device in accordance with some examples in the description.

DESCRIPTION

The present invention serves the function control of at least one consumer electronic device (e.g. TV device, AV receiver, sat receiver, multimedia player, Blu-ray player etc.) via suitable infrared and/or radio signals which are transmitted by an apparatus such as, in particular, a remote control, wherein the at least one device as well as the apparatus are equipped as control unit with a HDMI interface of specification 1.0 or higher. The HDMI connection between the apparatus and the at least one device of the replay chain may be established directly or indirectly such as e.g. via a splitter or switch or a further device of a given HDMI network. Within the framework of the method the apparatus is capable to determine the state of a device or of several devices of the HDMI network by using the data (preferably CEC data) transmitted via the HDMI connection and, if required, to adjust the intended command, optionally as a component of a several commands comprising command chain, to the determined device's state, such that the commands for the control of the at least one device actually being transmitted via infrared and/or radio corresponds to the user's intended function control, because it considers the determined state of the at least one device.

According to a preferred embodiment the determination of the state of the at least one device occurs on the basis of the CEC data comprised by the HDMI data stream.

According to a further preferred embodiment the above HDMI network, in addition to the apparatus and the at least one device, comprises one or several additional devices having at least one HDMI interface of specification 1.0 or higher the functions of which are also controllable with the apparatus.

As used herein, the term 'state' primarily relates to the operating condition of an involved device in the sense of 'on' and 'off' or 'standby', respectively. Moreover, the term also comprises further conditions of a given device, such as e.g. which HDMI input and which HDMI output are activated. Furthermore, the state may also relate to the specifications of the selected audio and video emission as known to the skilled person. Further, the state may relate to conditions which are relevant in the framework of multistep command chains (macro) or the transition of such a macro to another macro. For example, the first macro relates to the replay of a DVD on a beamer while simultaneously using a AV receiver. The second macro relates to the replay of a program received by a sat receiver. In this case, an intelligent transition should ensure that the beamer and AV receiver remain turned on while the sat receiver is switched on and the DVD player is turned off. Naturally, the HDMI input of the AV receiver needs to be changed from 'DVD' to 'Sat'.

According to a further aspect of the present invention, the at least one device of the HDMI replay chain is a device which cannot be controlled via discrete and thus different 'On' and 'Off' signals, but merely via a 'Power toggle' control command. While a common apparatus such as, in particular, a conventional remote control or universal remote control for turning on at least one desired device normally sends a concrete 'On' signal to the participating devices, what occurs independent from the as-is state of the at least one device and with regard to an already activated device leads to a signal and command redundancy without changing the operating condition and thus without negatively affecting the user, this command transmission from the apparatus to an already turned on HDMI network device displaying the above 'Power toggle' problem results in that this device, contrary to the user's intent, is not switched on but off, disrupting the replay chain, at least with regard to this device. For this reason, it is provided according to the invention that the as-is state of all devices comprised by the HDMI network is determined and considered in the framework of the control commands to be transmitted via infrared or radio. This means in the above case that the at least one device having the 'Power toggle' problem in contrast to the conventional command sequence does indeed not receive a (further) command to turn on in order to prevent the unintended powering off. It may be preferred that only the operating condition of a device having the mentioned 'Power toggle' problem is determined by the apparatus and considered in the command transmission.

Further, another preferred embodiment addresses the problem arising when the powering on and off of at least two devices of the HDMI replay chain is subjected to CEC control. This CEC control of both devices in the example of a television and a satellite receiver results in that the user e.g. switches on the receiver and happily recognizes that the television being triggered from turning on the receiver via CEC control is also switched on. If, however, the TV device in this example is a device with the 'Power toggle' problem and already turned on because the user followed a program before that e.g. was received with the internal tuner, the switching on of the receiver would cause an undesired powering off of the television. Likewise, the use of an apparatus such as, in particular, a conventional universal remote control would not put things right because as before the powering on of the receiver would turn the running television off.

If this desired application in the framework of a command sequence for both devices would have been defined as macro in a conventional universal remote control (e.g. sat receiver 'On', TV device 'On', TV device set to the correct input) and would the user activate this command sequence, the apparatus would firstly transmit a command for switching on to both devices before the TV device receives the request to activate the correct input. Given that both devices are switched off before the activation of the command sequence, this command sequence would match the user's intent. However, if the television would be switched on as before, the signal to switch on the receiver would cause activation with the television however being switched off ('Power toggle' command switches from 'On' to 'Off').

A further problem of higher complexity results from a CEC control possibly established between the devices involved by which the logical command sequence of a universal remote control could be compromised.

According to a preferred embodiment of the present method, such problems can be solved by determining each state (state of operation) of the devices involved in an established HDMI network before the actual command is transmitted to the respective device. Preferably, the determination of the state of operation refers only to those devices of the replay chain which have the 'Power toggle' problem.

Before the presently suggested control apparatus, preferably comprising the functionality of a universal remote control, can be used for the control of the devices involved in the HDMI network of one or several replay chains, these devices must be added to the data base of the apparatus which in the art may be effected by different means. The training of a remote control by using the original control unit the producer provided with the device to be controlled is cumbersome and nowadays is only applied in particular cases. Instead, the adding of the devices mostly is effected with the aid of an online data base (e.g. Harmony series from Logitech) which comprises a multitude of different devices and enables to configure complex macros by using numerous selectable single commands. These devices mostly have a USB interface in order to be connected to a PC or the like.

The apparatus suggested herein which can either be set up and configured directly or via an application software (app) has at least one HDMI interface in order to be connected to the HDMI network of the replay chain. Preferably, the actual control commands are transmitted to the devices via infrared and/or radio signals while the HDMI-connection to the network serves the determination of the state of at least one device of the replay chain, if required or desired. For the incorporation of the devices of the network to be controlled the user is requested to successively select the devices involved, wherein the selection may be carried out e.g. by means of the type designation of the device from a data base which is either provided in the memory of the apparatus or, alternatively or additionally, via an online connection to an external data base. According to a preferred embodiment, the apparatus in this way of setup receives all control commands of a given device from the data base and can save the same. This procedure of setting up or make to know preferably comprises the particular consideration of a device having the described 'Power toggle' problem in order to solve the problems mentioned hereinbefore. With other words, the apparatus upon setting up autonomously determines that the device to be added is one that has the 'Power toggle' problem. If not dealt with before, the apparatus promptly requests the user to establish a HDMI connection between the apparatus and the device, which can either be carried out directly or indirectly such as e.g. via a switch or splitter, or by connecting the apparatus to any device of the HDMI replay chain. Next, the user is requested to shortly switch on or off the device to be set up with the supplied remote control or directly at the device, whereby CEC signals are generated in the data bus of the established HDMI connection on the basis of which the device, with regard to its device-specific physical and/or logical address and/or further parameter, can definitely be identified, which can be used by the apparatus for all control commands for this device that are transmitted after the setup, which preferably relates to the determination of the operating state of this device in the framework of a simple control or highly complex command chain and the subsequent transmission of concrete commands adapted thereto.

If the device to be added forms part of a HDMI group involving further devices and if these devices are subjected to CEC control, the above mentioned request of the apparatus to switch on or off of the device for generating and determining the device-specific address via HDMI handshake may result in that this command of powering on or off via CEC control turns on or off other devices of the replay chain and thus hinders the assignment of the evolving CEC signal data to the target device. For this purpose, the configuration or design of the apparatus has several possibilities at it's disposal to filter out the desired signal for the respective device. For example, the apparatus already knows from the setup procedure which sort of device (Audio/Video source; display device; AV receiver etc.) is concerned. Further filter possibilities relate to the physical and/or logical address, the determined device producer or elements of the EDID data which are likewise determined via the established HDMI connection and used for the filtering.

The method envisages to save the data transmitted to the apparatus for the identification of the at least one device with the 'Power toggle' problem as such or after suitable preparation under access of the apparatus.

Accordingly, this enables the apparatus in the framework of the suggested method to determine the current operational state of the device and to transmit its commands for function control corresponding to the determined state of 'On' and 'Off' or 'Standby', respectively, wherein an established CEC control is preferably taken into consideration. The skilled person knows that besides these states there also exist intermediate conditional steps which may be designated 'transition to off' and 'transition to on' and inform the apparatus that the device is in the process of carrying out a command to switch off or on. These intermediate steps also represent data of the CEC control which upon determination of the state of a device can be determined and considered.

According to a further preferred aspect, the determination of the state enables the apparatus to evaluate which of the HDMI inputs and/or HDMI outputs of a given device are currently activated such that the apparatus can transmit its commands for the function control in correspondence of the determined state of the HDMI input and/or the HDMI output.

The invention claimed is:

1. A method for function control of at least one consumer electronic device with an apparatus, the method comprising:
transmitting at least one infrared or radio signal, wherein the at least one consumer electronic device and the apparatus have a High-Definition Multimedia Interface (HDMI) interface of specification 1.0 or higher and are in a framework of a HDMI network directly or indirectly connected to each other via the HDMI interfaces such that the apparatus determines at least one state of the at least one consumer electronic device based on an established HDMI connection, wherein the function control of the at least one consumer electronic device is carried out by the apparatus based on the at least one state of the at least one consumer electronic device with the at least one infrared or radio signal, wherein the at least one consumer electronic device includes a device that is controllable with a power toggle command and not a discrete on or off signal, and wherein the determination of the at least one state enables the apparatus to evaluate whether one or more HDMI inputs or HDMI outputs of the at least one consumer electronic device are currently activated and to transmit a command for the function control corresponding to the at least one state of the one or more HDMI inputs or HDMI outputs.

2. The method according to claim 1, wherein determining the at least one state of the at least one consumer electronic device is based on one or more Consumer Electronics Control (CEC) signals.

3. The method according to claim 2, wherein multiple consumer electronic devices, each having a HDMI interface of specification 1.0 or higher, are integrated into the HDMI network and controllable by the apparatus via respective infrared and/or radio signals.

4. The method according to claim 3, wherein the determination of the at least one state is limited to the device that is or devices that are controllable with the power toggle command or commands and not a discrete on or off signal.

5. The method according to claim 4, wherein the apparatus identifies the at least one consumer electronic device with a device-specific physical address, logical address, or parameter such that only the at least one consumer electronic device receives a correct command for the function control based on the at least one state.

6. The method according to claim 5, wherein the apparatus identifies the at least one consumer electronic device based on a procedure wherein the device, after a corresponding request of the apparatus, is switched on or off in response to an infrared signal or radio signal or directly at the device, thereby transmitting to the apparatus via the HDMI connection a signal corresponding to the procedure.

7. The method according to claim 6, wherein data transmitted to the apparatus for the identification of the at least one consumer electronic device are saved.

8. The method according to claim 1, wherein the determination of the at least one state enables the apparatus to evaluate an operational condition of the at least one consumer electronic device and to transmit the command for the function control corresponding to the at least one state, wherein the at least one state includes an on state, an off state, or a standby state.

9. An apparatus for function control of at least one consumer electronic device, the apparatus being configured to:
transmit at least one infrared or radio signal, wherein the at least one consumer electronic device and the apparatus have a High-Definition Multimedia Interface (HDMI) interface of specification 1.0 or higher and are in a framework of a HDMI network directly or indirectly connected to each other via the HDMI interfaces such that the apparatus determines at least one state of the at least one consumer electronic device based on an established HDMI connection, wherein the function control of the at least one consumer electronic device is carried out by the apparatus based on the at least one state of the at least one consumer electronic device with the at least one infrared or radio signal, wherein the at least one consumer electronic device includes a device that is controllable with a power toggle command and not a discrete on or off signal, and wherein the determination of the at least one state enables the apparatus to evaluate whether one or more HDMI inputs or HDMI outputs of the at least one consumer electronic device are currently activated and to transmit a command for the function control corresponding to the at least one state of the one or more HDMI inputs or HDMI outputs.

10. The apparatus of claim 9, wherein determining the at least one state of the at least one consumer electronic device is based on one or more Consumer Electronics Control (CEC) signals.

11. The apparatus of claim 10, wherein multiple consumer electronic devices, each having a HDMI interface of specification 1.0 or higher, are integrated into the HDMI network and controllable by the apparatus via respective infrared and/or radio signals.

12. The apparatus of claim 11, wherein the determination of the at least one state is limited to the device that is or devices that are controllable with the power toggle command or commands and not a discrete on or off signal.

13. The apparatus of claim 12, wherein the apparatus identifies the at least one consumer electronic device with a device-specific physical address, logical address, or parameter such that only the at least one consumer electronic device receives a correct command for the function control based on the at least one state.

14. The apparatus of claim 13, wherein the apparatus identifies the at least one consumer electronic device based on a procedure wherein the device, after a corresponding request of the apparatus, is switched on or off in response to an infrared signal or radio signal or directly at the device, thereby transmitting to the apparatus via the HDMI connection a signal corresponding to the procedure.

15. The apparatus of claim 14, wherein data transmitted to the apparatus for the identification of the at least one consumer electronic device are saved.

16. The apparatus of claim 9, wherein the determination of the at least one state enables the apparatus to evaluate an operational condition of the at least one consumer electronic device and to transmit the command for the function control corresponding to the at least one state, wherein the at least one state includes an on state, an off state, or a standby state.

* * * * *